United States Patent [19]

Jäntti et al.

[11] Patent Number: 5,752,161
[45] Date of Patent: May 12, 1998

[54] METHOD AND APPARATUS FOR REPLACING A FAILED CHANNEL UNIT OF A SECTORED BASE STATION, IN A CELLULAR RADIO SYSTEM, WITH AN ADDITIONAL CHANNEL UNIT

[75] Inventors: Arto Jäntti; Keijo Katisko, both of Oulu, Finland

[73] Assignee: Nokia Telecommunications Oy, Espoo, Finland

[21] Appl. No.: 619,729

[22] PCT Filed: Sep. 22, 1994

[86] PCT No.: PCT/FI94/00424

§ 371 Date: Mar. 22, 1996

§ 102(e) Date: Mar. 22, 1996

[87] PCT Pub. No.: WO95/08875

PCT Pub. Date: Mar. 30, 1995

[30] Foreign Application Priority Data

Sep. 24, 1993 [FI] Finland .................. 934198

[51] Int. Cl.⁶ ............... H04B 3/36; H04B 7/14
[52] U.S. Cl. ............... 455/8; 455/9; 455/561
[58] Field of Search ............... 455/8, 9, 33.1, 455/53.1, 54.1, 54.2, 56.1, 67.1, 103, 422, 507, 517, 524, 510, 78, 62, 79, 561, 562, 516

[56] References Cited

U.S. PATENT DOCUMENTS 5,157,667  10/1992  Carusone, Jr. et al. ............ 455/8
5,551,056  8/1996  Koponen et al. ............ 455/8
5,557,603  9/1996  Barlett et al. ............ 455/8

FOREIGN PATENT DOCUMENTS 0 359 535  3/1990  European Pat. Off. .
0 550 394  7/1993  European Pat. Off. .
911199    3/1991  Finland .

OTHER PUBLICATIONS

Patent Abstracts of Japan, vol. 11, No. 271, E–536, Abstract of JP, A, 62–72235 (Oki Electric Ind Co. Ltd), 2 Apr. 1987.

*Primary Examiner*—Reinhard J. Eisenzopf
*Assistant Examiner*—Gertrude Arthur
*Attorney, Agent, or Firm*—IP Group PF Pillsbury Madison & Sutro LLP

[57] ABSTRACT

A method for securing the operation of a base station having a radio coverage area divided into at least two sectors, and a base station having antennas, with combiners and branching units, and at least one channel unit for each sector, which allow the base station to establish a radio connection with active radio transceivers currently located in the base station sectors. In the method, the base station is provided with an additional channel unit the traffic capacity of which is selectably switchable to one of the base station sectors. To secure the operation of the base station when one of the channel units fails, the operation of the channel units of the base station is monitored. When one of the channel units fails, the additional channel unit is connected to the antenna of the sector of the failed channel unit by a switch, which connects the antenna attachments of the additional channel unit to the antenna of one sector at a time.

9 Claims, 1 Drawing Sheet

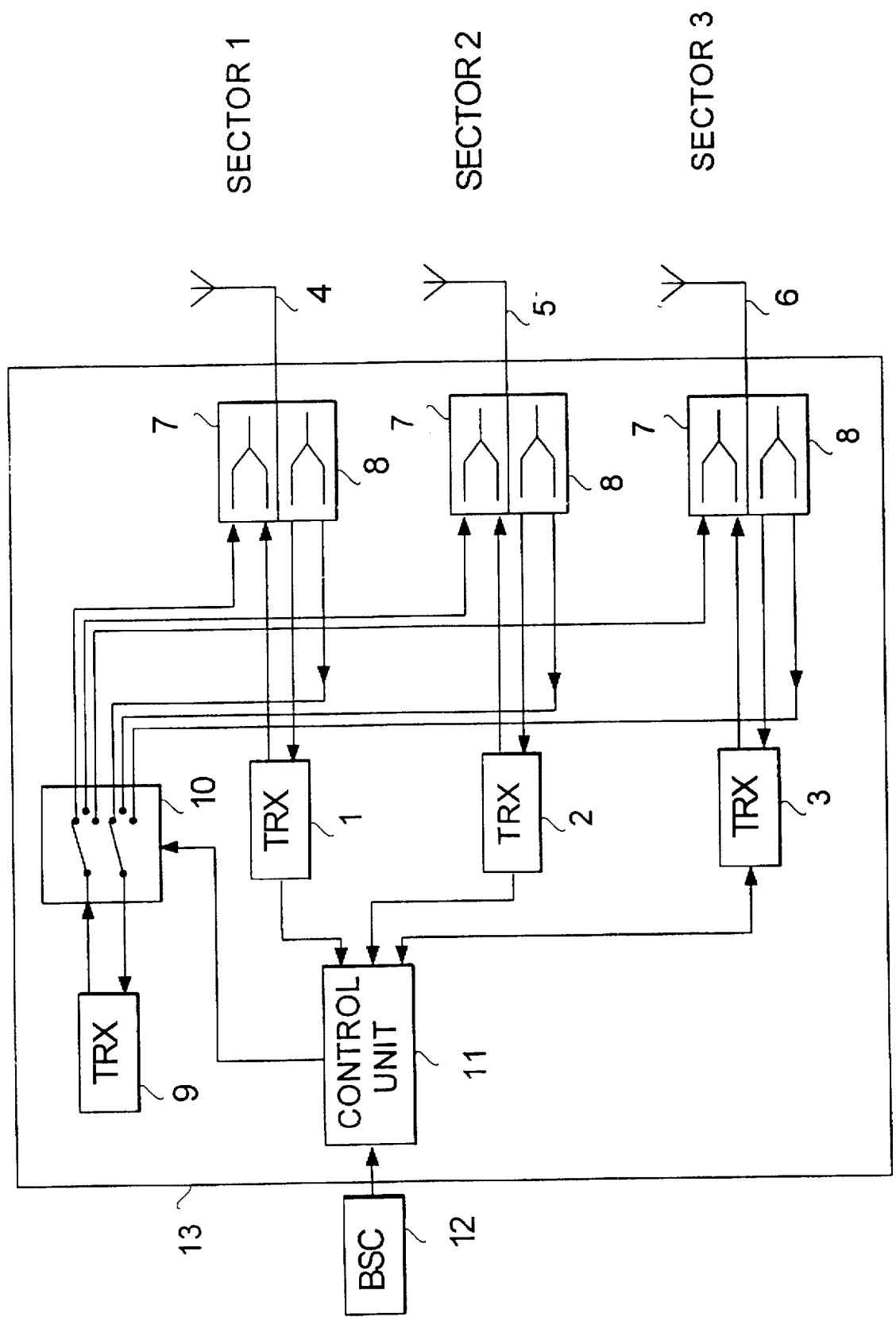

METHOD AND APPARATUS FOR REPLACING A FAILED CHANNEL UNIT OF A SECTORED BASE STATION, IN A CELLULAR RADIO SYSTEM, WITH AN ADDITIONAL CHANNEL UNIT

This application claims benefit of international application PCT/FI94/00424 filed Sep. 22, 1994.

TECHNICAL FIELD

The invention relates to a method for securing the operation of a base station having a radio coverage area divided into at least two sectors, the base station comprising antenna means and at least one channel unit for each sector, which allow the base station to establish a radio connection with active radio transceivers currently located in the sectors of the base station, wherein the base station is provided with an additional channel unit the traffic capacity of which is selectably switchable to one of the base station sectors. The invention also relates to a base station in a radio system, the radio coverage area of the base station being divided into at least two sectors and the base station comprising antenna means and at least one channel unit for each sector, which allow the base station to establish a radio connection with active radio transceivers currently located in the sectors of the base station, the base station further comprising an additional channel unit the traffic capacity of which is selectably switchable to one of the base station sectors.

As used herein, the term antenna means refers not only to the antenna required for transmission and reception but also to the means that connect the antenna attachments of a channel unit to the antenna of the base station. Such means include a combiner means, which combines signals transmitted by channel units intended to be used in the same sector before they are applied to the antenna, and a branching means, which filters and amplifies signals received by the antenna of a specific sector and branches them to the receivers of different channel units.

TECHNICAL BACKGROUND ART

Finnish Patent Application 911 199 discloses a solution where an additional channel unit is connected to a sectored base station in a cellular radio system. The additional channel unit can be connected to a sector that instantaneously needs additional capacity. In this solution, the additional channel unit is connected so that its transmitter can be switched by a relay switch to a combiner means belonging to the antenna means of the selected sector. On the contrary, the reception side of the additional channel unit is implemented such that signals received from different sectors are combined by a combiner means and applied to the receiver of the additional channel unit. Accordingly, signals received from each sector of the base station are thus continually applied to the receiver of the additional channel unit.

The solution according to Finnish Patent Application 911 199, where signals from each sector of the base station are applied continually to the additional channel unit, has several drawbacks, the most severe being:

complicated cabling;

susceptibility to interference when the fixed channel unit of one of the sectors fails in such a way that the antenna attachment of the receiver of the failed channel unit forwards signals interfering with the other channel units of the base station; this interference may render all of the receivers of the base station inoperative, as the receiver of the failed channel unit is still connected to the other receivers of the base station through the combiner means of the reception side;

susceptibility to interference during normal traffic operation due to the fact that the additional channel unit is permanently connected to all of the sectors of the base station so that it also gathers interferences and background noise from within all sectors. In the worst case, it may happen that a signal received by the receiver of the additional channel unit from a cell of another mobile radio network covers a desired signal or at least substantially deteriorates the quality of the connection (the solution does not follow the frequency re-use scheme that has been made specifically for each sector);

greater attenuation due to the summing of signals on the reception side, which causes a greater attenuation on the signal path, so that the sensitivity of the receivers is impaired.

SUMMARY OF THE INVENTION

The object of the present invention is to avoid the above problems and to provide a method by means of which a failed channel unit of a sectored base station in a cellular radio system can be replaced with an additional channel unit, and which ensures that the failed channel unit will not interfere with the operation of the other channel units of the base station when the antenna attachment of the failed channel unit forwards signals at a frequency such that they would otherwise interfere with the operation of the base station. These objects are achieved by a method according to the invention, which is characterized by monitoring the operation of the channel units of the base station; and switching, when one of the channel units fails, the additional channel unit to the antenna means of the sector of the failed channel unit by a switching means which connects the antenna attachments of the additional channel unit to the antenna means of one sector at a time.

The invention also relates to a base station where the method according to the invention can be applied. The base station according to the invention is characterized in that the additional channel unit is switched to the antenna means of a selected sector by a switching means, which connects the antenna attachments of the additional channel unit to the antenna means of one sector at a time.

The invention is based on the idea that the operation of a sectored base station can be secured more efficiently and reliably than previously when one of the channel units fitted in the base station fails by providing an additional channel unit in the base station. The antenna attachments of the additional channel unit can be switched to one of the antennas of the base station by a relay-type switch. This switching ensures that the failed channel unit will not interfere with the other receivers at the base station due to signals possibly propagating through its antenna attachments. The most important advantage of the method and the base station according to the invention is thus that they minimize the disadvantage caused by the failure of a channel unit. At best, the failed channel unit can be replaced with the additional channel unit, whereby normal traffic operation can be continued immediately even in the sector of the failed channel unit. Not even in the worst case is the failure able to interfere with traffic taking place in the other sectors.

Another major advantage of the method and the base station according to the invention is that a single switching means, i.e. a relay-type switch, is needed for the switching which replaces the failed channel unit with the additional channel unit. The solution according to the invention is thus simpler and cheaper than the prior art solutions.

Other advantages of the method and the base station according to the invention over the prior art include simple cabling, lower level of background noise in reception, excellent sensitivity of reception, and the possibility to utilize the additional channel unit while following the sector-specific frequency re-use scheme.

BRIEF DESCRIPTION OF THE DRAWING

In the following, the invention will be described more fully by means of a preferred embodiment with reference to the attached FIGURE, which shows a preferred embodiment of a base station according to the invention.

DETAILED DESCRIPTION OF A PREFERRED EMBODIMENT

The FIGURE shows a sectored GSM base station the coverage area of which is divided into three sectors. The structure and operation of the GSM system are described e.g. in *The GSM System for Mobile Communications*, M. Mouly & M-B Pautet, Palaiseau, France, 1992, ISBN: 2-9507190-0-7, wherefore they will not be described more closely herein.

The base station 13 shown in the FIGURE comprises a fixed channel unit (TRX) 1, 2 and 3, and an antenna 4, 5 and 6 for each sector of the base station, respectively, whereby the base station is able to establish a radio connection with active radio transceivers located in the sectors. The transceivers 1, 2 and 3 are connected to the antennas 4, 5 and 6 by combiner means 7 and branching means 8. If required, more than one channel unit can be connected to each antenna, while the combiner means 7 combine signals from the different transmitters before they are applied to the antenna, and the branching means 8 apply the signals received by the antenna to the receivers of the different channel units. The antenna, combiner means and branching means will be referred to as antenna means below.

The base station 13 shown in the FIGURE further comprises, in addition to the fixed channel units 1, 2 and 3, an additional channel unit 9, the antenna attachments of which can be connected by a switching means 10 to the antenna means of sector 1, sector 2 or sector 3 so that the traffic capacity of the additional channel unit is available to the concerned sector. The switching means 10 is a relay-type switch, the operation of which is controlled by a control unit 11.

The control unit 11 monitors the operation of the fixed channel units 1, 2 and 3 during the normal operation of the base station. The control unit is connected to a base station controller (BSC) 12. If one of the channel units fails, the control unit 11 connects the antenna attachments of the additional channel unit 9 by the switch 10 to the sector of the failed channel unit. This measure thus requires a single component, i.e. the relay-type (or semiconductor-type) switch 10.

As appears from the FIGURE, there is no connection between the antenna attachments of the channel units 1, 2 and 3, which ensures that if there should occur such a failure in one of the channel units that the antenna attachment of the channel unit would forward signals of a frequency which could interfere with the operation of the other channel units of the base station, these signals would not be able to propagate to the other channel units of the base station.

It is to be understood that the above description and the FIGURE related to it are only intended to illustrate a preferred embodiment of the base station according to the invention without limiting the invention as such. Accordingly, it is obvious that the number of base station sectors, fixed channel units and additional channel units may differ from the above example, and that the method and the base station according to the invention can also be utilized in other systems than the GSM system, even though the invention has been described above by way of example with reference to the GSM system. The preferred embodiments of the method and the base station according to the invention may vary within the scope of the attached claims.

We claim:

1. A method for securing the operation of a base station having a radio coverage area divided into at least two sectors, the base station comprising individually for each said sector an antenna, a combiner arranged for combining signals transmitted by a plurality of channel units to be applied to the antenna, a brancher for branching arranged signals received by the antenna to receivers of a plurality of channel units, and at least one channel unit assigned for each sector, each said assigned channel unit being arranged to be operatively connected by a respective combiner and a respective said brancher to a respective said antenna, collectively for enabling the base station to establish radio connection with active radio transceivers currently located in the respective sectors of the coverage area, wherein the base station is provided with an additional channel unit having a traffic capacity which is selectably switchable to any one or none of the base station sectors, said method comprising:

monitoring the operation of the assigned channel units of the base station; and switching, when one of the assigned channel units fails, the additional channel unit to the combiner and brancher of the failed assigned channel unit by connecting antenna attachments of the additional channel unit thereto without thereby connecting said antenna attachments to an assigned channel unit for another said sector.

2. The method according to claim 1, wherein:
the switching is accomplished using a relay switch.

3. The method according to claim 1, wherein:
the base section is a base station in a cellular radio system.

4. The method according to claim 1, wherein:
the base station is a base station in a GSM system.

5. A base station in a radio system, and arranged to serve a radio coverage area which is divided into at least two sectors, said base station comprising:

individually for each said sector an antenna, a combiner arranged for combining signals transmitted by a plurality of channel units to be applied to the antenna, a brancher arranged for branching signals received by the antenna to receivers of a plurality of channel units, and at least one channel unit assigned for each sector, each said assigned channel unit being arranged to be operatively connected by a respective combiner and a respective said brancher to a respective said antenna, collectively for enabling the base station to establish a radio connection with active radio transceivers currently located in the respective sectors of the coverage area;

an additional channel unit having a traffic capacity which is selectably switchable to any one or none of the base station sectors; and a switch arranged for connecting the additional channel unit to the combiner and brancher of antenna attachments of the additional channel unit without thereby connecting said antenna attachments to an assigned channel for another said sector.

6. The base station according to claim 5, further comprising:

a control means, which monitors the operation of the assigned channel units, the control means being arranged for controlling the switching means so that when an assigned channel unit fails, the control means connects the antenna attachments of the additional channel unit to the antenna means of the failed assigned channel unit.

7. The base station according to claim 5, wherein the switching means is a relay switch.

8. The base station according to claim 5, wherein the base station is a base station cellular radio system.

9. The base station according to claim 5, wherein the base station is a GSM system base station.

* * * * *